INVENTORS
JAMES A. MILNES and
WILLIAM L. ROBERTS
By Donald G. Dalton
Attorney

United States Patent Office 3,280,692
Patented Oct. 25, 1966

3,280,692
APPARATUS FOR MEASURING THE DEFECTIVE SURFACE AREA OF AN OBJECT
James A. Milnes, Pitcairn, and William L. Roberts, Murrysville, Pa., assignors to United States Steel Corporation, a corporation of Delaware
Filed Dec. 21, 1960, Ser. No. 77,349
3 Claims. (Cl. 88—14)

This invention relates to apparatus for measuring the defective surface area of an object and more particularly for automatically measuring the defective area of moving tin plated steel strip. The strip often travels at speeds in excess of 1000 feet per minute at which speeds visual inspection of the strip becomes impossible. Various automatic inspection systems have been devised, such as the television system taught by Summerhayes Patent No. 2,798,966 which produces an electric signal that is proportional to the surface quality of the strip. Heretofore, it has been the practice to count the total number of defects in the strip but this information bears little if any relation to the useable amount of material. The total area affected by defects in a given portion of the strip includes, not only the actual defective area, but also an area adjacent the defective area which is affected by the defect. The magnitude of the area so affected will depend upon the size of the pieces which are to be punched from the material. Assuming a constant defective area, the adjacent affected area will increase as the size of the articles to be punched from the strip increases.

Therfeore, it is an object of our invention to provide apparatus for automatically measuring the defective surface area of a moving object.

Another object is to measure the area affected by imperfections in the tin coating of steel strip.

These and other objects will be more apparent after referring to the following specification and attached drawings, in which.

Figure 1:
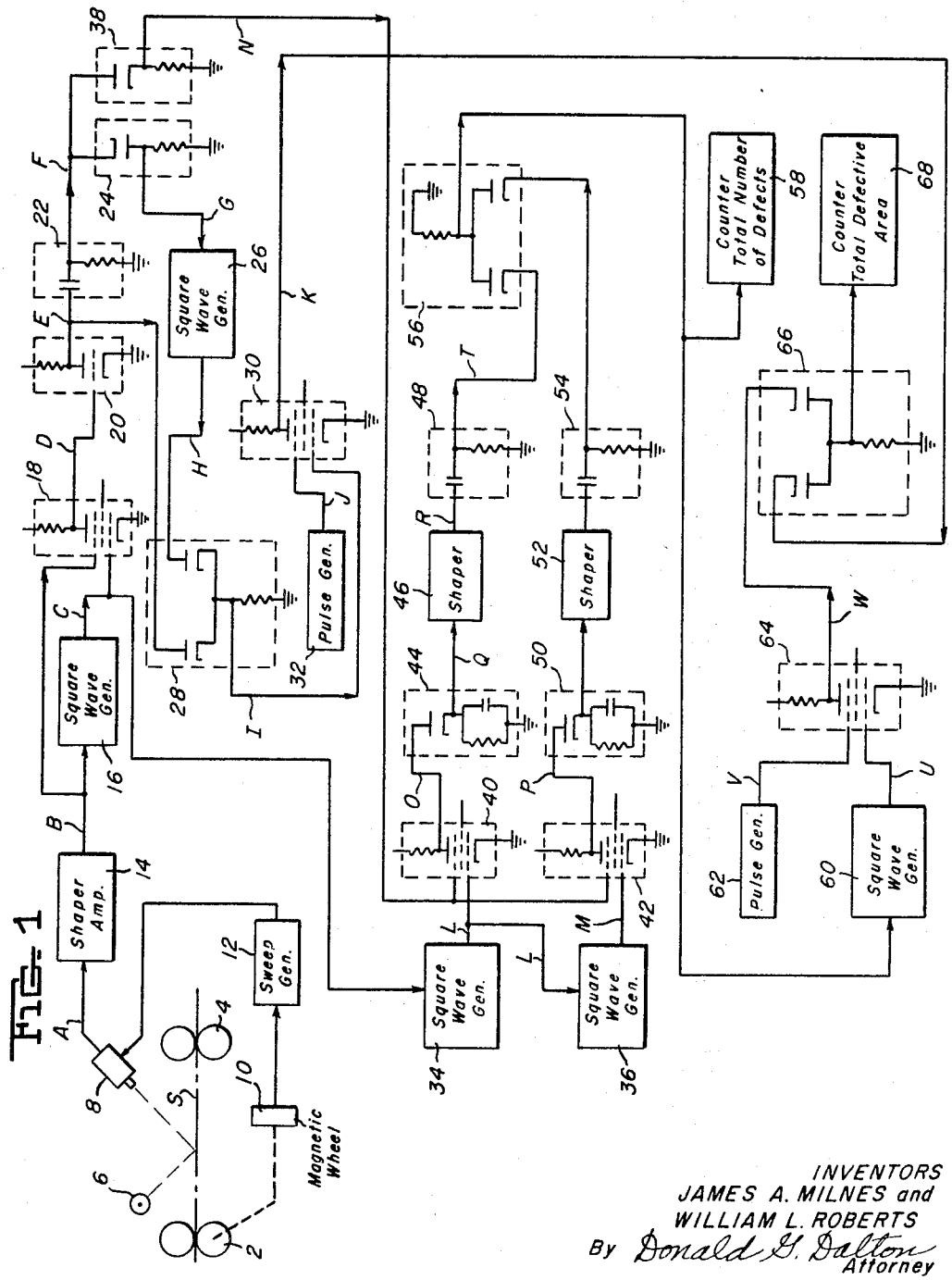
FIGURE 1 is a schematic diagram of the preferred embodiment of our invention.
Figure 2:
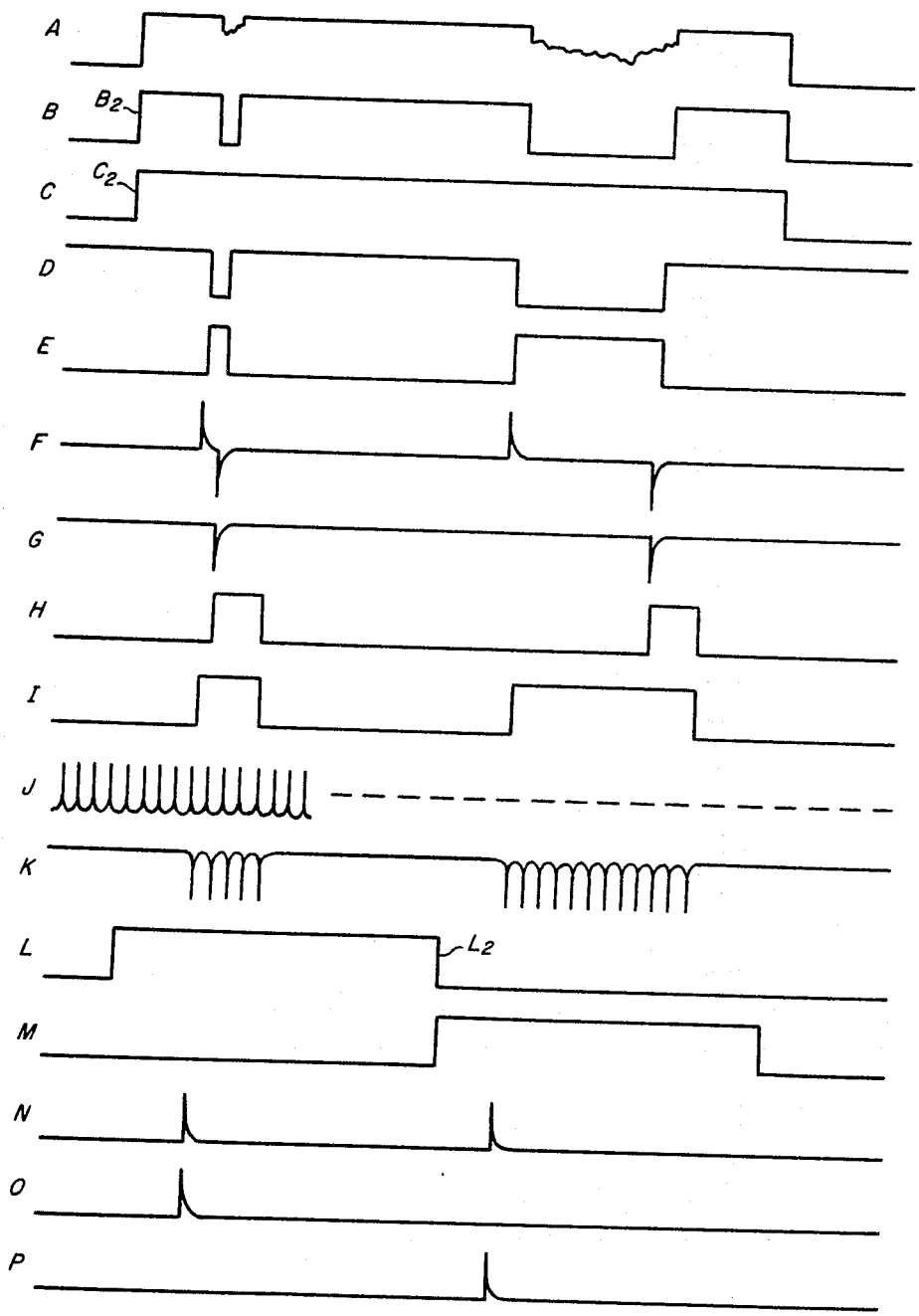
FIGURE 2 is a series of graphs showing the voltage versus time relationship of various points in FIGURE 1.

Referring more particularly to the drawings, reference numerals 2 and 4 indicate two spaced apart pairs of rotating rolls, which may be at the end of an electrolytic tinning line, through which strip S travels. Situated above the strip S and disposed transverse to the direction of strip travel is a light filament 6 which is provided with a lens system, not shown, for projecting a line of light onto the surface of the strip S. Also situated above the strip S is a conventional television camera unit 8 so positioned that the light reflected by the strip S will impinge upon it. A magnet wheel 10 is rotated by one of the rolls 2 at a speed equal to or proportional to strip speed. The magnet wheel 10 produces pulses at a rate proportional to the speed of travel of strip S. These pulses are fed to a sweep generator 12 which produces the horizontal (i.e., transverse to the direction of strip travel) sweep signals for the television camera unit 8. The electrical apparatus so far described is essentially that shown in the above mentioned Summerhayes patent. A video signal produced by the camera unit 8 is represented by curve A on FIGURE 2 and is fed to a conventional shaper-amplifier 14 which will produce an output as shown by curve B of FIGURE 2. The signal B has two distinct levels, one representing perfect strip surface and the other representing defective surface. The output B of the shaper-amplifier 14 is connected to a square wave generator 16 which is preferably a conventional phantastron circuit. This circuit produces a square wave C of a duration proportional to the width of the strip S each time the leading edge $B_2$ of the signal B occurs. The duration of the square wave C is adjustable so as to accommodate strip of different widths. The signals B and C are fed to a gate circuit 18 which is preferably a pentode vacuum tube in which the signal C is connected to the control grid and the signal B is connected to the suppressor grid. The width of the negative pulses in the output D of the gate 18 is proportional to the width of the defects in strip S. The signal D is fed to an inverter 20 which is preferably a single stage vacuum tube amplifier with an output E. The inverted signal E is fed to a conventional differentiator circuit 22 which is preferably a capacitor in series with a resistor to ground. The output F of differentiator 22 is connected to a clipper circuit 24 which preferably comprises a diode in series with a resistor to ground with the diode so polarized that only the negative pulses of the signal F are passed, as in signal G. The pulses of signal G, which represent the trailing edge of the defects, are used to trigger a square wave generator 26 which is preferably a phantastron circuit in which the square waves in its output H are proportional to the width of the area affected by a defect and transversely adjacent to the defect. The duration of the square waves H is adjustable to provide for measurements for various sized pieces that will be punched from the strip. The signals E and H are fed into an adder circuit 28 which preferably comprises two diodes with common cathodes at the output which is a signal as shown by graph I. Thus the width of the square waves shown in I is equal to the sum of the widths of the square waves of E and H. The signal I is fed into a gate circuit 30 which is preferably a vacuum pentode with the signal I being connected to its control grid and the output J of a pulse generator 32 being connected to its suppressor grid. The pulse generator 32 is a conventional device and produces a series of pulses at a constant rate as shown by graph J. The repetition rate of the pulses is adjustable. The number of pulses in output K of gate 30 is proportional to the width of the square waves in output I which, in turn, is proportional to the width of the area affected by the defects. The output C of the square wave generator 16 is connected to a square wave generator 34 which is preferably a phantastron circuit and produces a square wave L, the duration of which is one-half that of the square wave C. The square wave generator 34 is triggered by the leading edge $C_2$ of the square wave C. The output L of the square wave generator 34 is connected to a square wave generator 36 which is preferably a phantastron circuit and is triggered by the trailing edge $L_2$ of the square wave L. The output M of the square wave generator 36 is a square wave with a duration equal to that of the square wave L. The output of the differentiator 22 is connected to a clipper circuit 38 which is preferably a diode in series with a resistor to ground. The diode is so polarized that only the positive pulses of the signal F (corresponding to the leading edge of the defects) are passed as shown by graph N. The signals N and L are connected to a gating circuit 40 which is preferably a pentode vacuum tube with signal L being connected to its control grid and signal N being connected to its suppressor grid. The output of circuit 40 is shown by graph O. A gating circuit 42, identical to the gating circuit 40, has the signal M connected to its control grid and the signal N connected to its suppressor grid. The gating circuit 42 has an output P. The output O of the gate 40 is connected to an integrator 44 which is preferably a diode in series with a parallel resistor-capacitor to ground. The time constant of the resistor-capacitor circuit is longer than the period between successive square waves in the signal L. The output Q of the integrator 44 is connected to a shaping circuit 46 which produces a square wave R which wave persists so long as the wave Q has not returned to the zero or ground level. The square wave R is fed to a differentiator 48 which produces a pulse at the beginning and at the end of the square wave R as shown in graph T. Associated with the square wave generator 36 and the gate 42 are an integrator 50 which is similar to integrator 44, a shaper 52 which is similar to shaper 46, and a differentiator 54 which is similar to differentiator 48. The outputs of the differentiators 48 and 54 are connected to an adder 56 which preferably comprises two diodes with common anodes at the output so that only the negative pulses are passed. The output of the adder 56 is connected to a conventional decimal counter 58 which accumulates the total number of defects detected. The output of the adder 56 is also connected to a square wave generator 60 which is preferably a phantastron circuit which produces a square wave for each pulse fed into it. The width of the output wave U of the square wave generator 60 is adjustable. The signal U and the output V of a pulse generator 62 are connected to a gating circuit 64 which comprises a pentode vacuum tube with the signal U being connected to its control grid and the signal V connected to its suppressor grid. The pulse generator 62 is a conventional device in which the repetition of the pulses produced by it are adjustable. The output W of the gate 64 includes a number of pulses and is connected to an adder 66 to which is also connected the output K of the gate 30. The adder 66 preferably comprises two diodes with common anodes which are connected to a conventional decimal counter 68 which counts the total area of the strip affected by the defective area.

Figure 4:
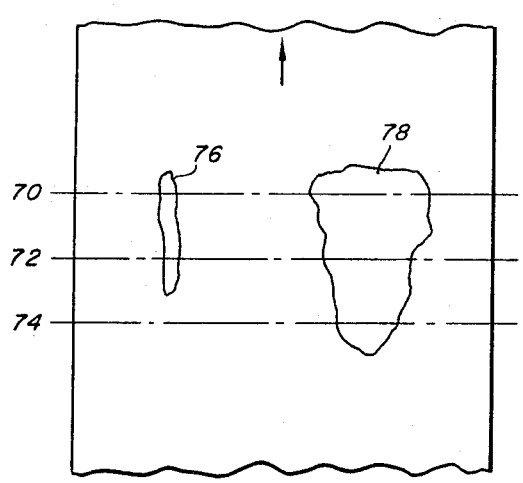
FIGURE 4 is a plan view of a portion of strip having defects therein.

The operation of our device is as follows:

As the strip S travels between the rolls 2 and 4 magnet wheel 10 is rotated so that it produces a series of pulses. The magnet wheel 10 is arranged so that ten pulses are produced for each inch of strip that passes. These pulses trigger the sweep generator 12 which causes the beam of camera unit 8 to sweep across the width of the strip ten times per inch. If the strip travels at 1000 feet per minute (200 inches per second), 50 microseconds are available for each sweep and flyback of the camera tube 8. Equipment capable of this speed is available commercially. Three successive sweeps are shown in FIGURE 4 as 70, 72 and 74 at a portion of strip having two defects 76 and 78. The video signal produced at line 70 is shown by graph A in which the width of the signal is proportional to the width of the defect. After the video signal is shaped by shaper-amplifier 14 (graph B) it is gated with the square wave C to eliminate signals from the edges of the strip (graph D) and inverted (graph E) by inverter 20. The width of the positive signals in the output E of the inverter 20 is proportional to the width of the defects. In order to provide for the addition of an area transversely adjacent to the defect we add an area of a width X. Each pulse from clipper 24 represents the right hand side of a defect and such pulse triggers the square wave generator 26 whose output square wave H has a width proportional to X. The width X may be thought of as two widths, each being $X/2$ and situated on opposite sides of the defect as in FIGURE 5, but for simplicity we add one width of X units. The signal E, representing the width of the actual defect, and the signal H, representing the affected portion X, are added in adder circuit 28, the output I of which contains square waves whose durations are proportional to the widths of the areas affected by the defects. These square waves are used to gate the pulses from pulse generator 32 to counter 68 with the result that the number of pulses passed by gate 30 is proportional to the width of the defect. The repetition rate of the pulse generator 32 is so selected that one pulse is produced per inch of strip width. In one installation of our invention the beam of the camera unit requires 40 microseconds to traverse a strip width of 40 inches and, therefore, a pulse repetition rate of 1 megacycle per second from the pulse generator will give the desired one pulse per inch of strip width. Because there are ten sweeps of the beam of camera unit 8 per inch of length of strip S, the total number of pulses passed by the gate 30 will be equal to ten times the area, in square inches, of the defect.

Figure 3:
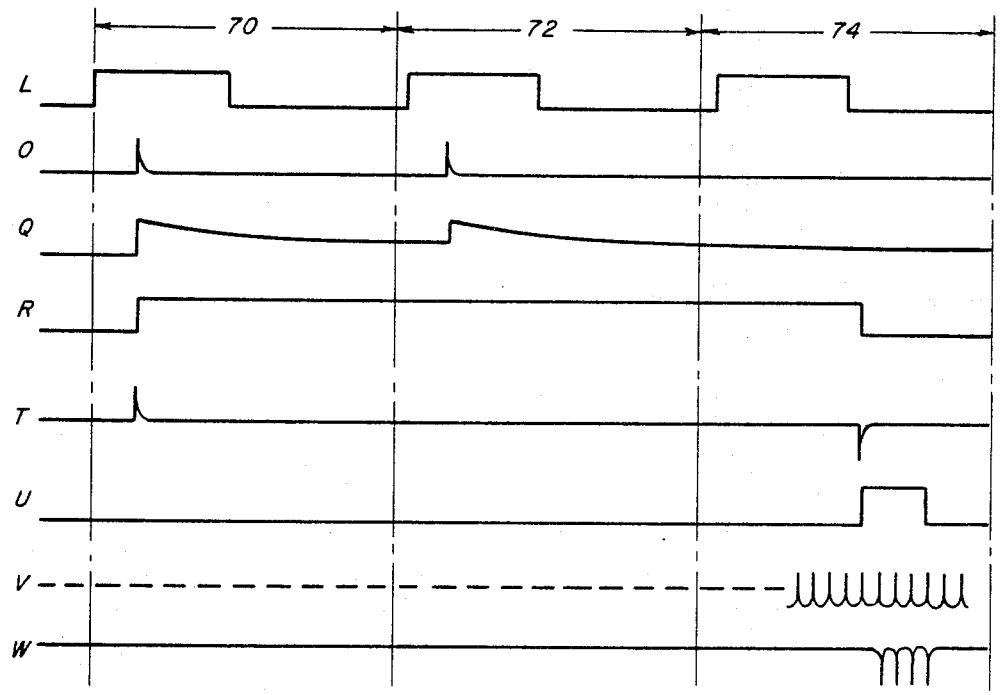
FIGURE 3 is a series of graphs showing the voltage versus time relationship of various points in FIGURE 1 with a time base different from that of FIGURE 2.
Figure 5:
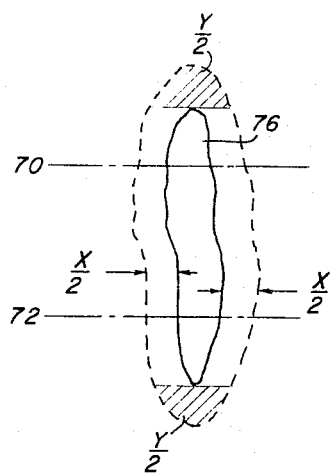
FIGURE 5 is an enlarged view of one of the defects of FIGURE 4.

In order to obtain the total area affected by a defect it is necessary to add an area on the end of each defect. Such area will exist on each end of the defect as shown in FIGURE 5 by $Y/2$ but for simplicity we add one area Y. It is first necessary to decide the maximum number of defects that is likely to occur on any single sweep of the beam of camera unit 8. In our preferred embodiment we have assumed this number to be two but any number may be chosen. The strip is theoretically divided into two equal portions by triggering the square wave generator 34 with the leading edge $C_2$ of the output C of square wave generator 16. The duration of the square wave L is one half that of C and the trailing edge $L_2$ of signal L triggers the squarewave generator 36 whose output M also has a duration one half that of signal C. The signal L and M are used to gate the signal N which contains one pulse for each defect occurring in each transverse sweep of the beam of camera unit 8. Thus, the output O of gate 40 contains pulses representing defects in the left-hand side of the strip and the output P of the gate 42 contains pulses representing defects in the right-hand side of the strip. Because both sides are treated identically, only one will be described in detail. Graph O of FIGURE 3 shows the output of the gate 40 for the sweeps 70, 72 and 74 of the beam of camera unit 8. The existence of a pulse in sweeps 70 and 72 indicates that a defect has been viewed by the camera unit 8 while the absence of a pulse in sweep 74 shows that the defect has ended. Signal O is fed to integrator 44 whose output Q cannot fall to zero until a sweep occurs in which no defect exists, that is, sweep 74. The irregular shape of the signal Q is converted into a square wave R by shaper 46. Differentation of the signal R by differentiator 48 produces the signal T which contains one negative pulse for each defect existing in the left-hand side of the strip. The circuits bearing reference numerals 36, 42, 50, 52, and 54 perform the same function with respect to the right-hand side of the strip so that the output of differentiator 54 contains one negative pulse for each defect in the right-hand side of the strip. The outputs of differentiators 48 and 54 are connected to adder circuit 56 the output of which is connected to the counter 58 which accumulates the total number of defects in the strip. The output of adder circuit 56 is also connected to a square wave generator 60 which produces an output U containing a square wave for each defect in the strip. This square wave gates pulses from the pulse generator 62 in such manner that the output W contains a number of pulses for each defect which number depends upon the width of the square wave U and the repetition rate of the pulse generator 62. Since this number must correspond to the area Y, because $Y = \pi/4 X^2$ square inches, and since 10 pulses per square inch of affected area are fed into the counter 68 $10\pi/4 X^2$ pulses must be generated for each defect. We obtain this by setting the width of square wave U as X and the repetition rate of the pulse generator 62 as $10\pi/4$ or 7.83 megacycles. Although pulse generator capable of this repetition rate are commercially available we prefer to use a repetition rate of .783 megacycle and to connect the output W of the gate 64 to the "tens"

input of the counter 68. Thus the total count accumulated by the counter 68 will account for the areas X and Y and will be equal to ten times the total affected area in square inches.

While one embodiment of our invention has been shown and described it will be apparent that other adaptations and modifications may be made without departing from the scope of the following claims.

We claim:

1. Apparatus for measuring the defective area of the surface of a moving object comprising means for illuminating said moving object, signal generating means responsive to light reflected from said object, scanning means for causing said signal generating means to traverse the width of the object at a controlled speed so that a signal is developed in said signal generating means having a duration proportional to the length of the defective area along a line substantially transverse to the direction of movement of the object, means proportional to the speed of the object for causing said scanning means to repetitively sweep said signal generating means across said moving object at a controlled rate, means responsive to said signal generating means for generating a second signal of a preselected duration each time there is a signal generated during a sweep by said first generating means when there is no signal generated during the adjacent sweep, a third means for generating a signal of a preselected duration for each signal generated by said first generating means and responsive to said first generating means, and means for measuring the duration of the signals generated by all three of said signal generating means.

2. Apparatus for measuring the defective area of the surface of a moving object comprising means for illuminating said moving object, signal generating means responsive to light reflected from said object, scanning means for causing said signal generating means to optically traverse the width of the object at a controlled speed so that a signal is developed in said signal generating means having a duration proportional to the length of the defective area along a line substantially transverse to the direction of movement of the object, means proportional to the speed of the object for causing said scanning means to repetitively sweep said signal generating means across said moving object at a controlled rate, means responsive to said signal generating means for generating a second signal of a preselected duration each time there is a signal generated during a sweep by said first generating means when there is no signal generated during the adjacent sweep, a third means for generating a signal of a preselected duration for each signal generated by said first generating means and responsive to said first generating means, means for generating a series of pulses at a preselected repetition rate, a pulse counter, and means for gating to said counter the pulses produced by said pulse generating means during the duration of the signal produced by said first signal generating means, the signal produced by said second signal generating means and the signal produced by said third signal generating means.

3. Apparatus for measuring the defective area and counting the number of defects in a moving strip comprising means for illuminating the surface of said strip, signal generating means responsive to light reflected from said strip, said last named means including a television camera tube, a circuit for shaping the output signal of said camera tube and an amplifier for the shaped signal, a sweep generator for causing said television camera tube to optically traverse the width of the strip at a controlled speed so that a signal is developed in said signal generating means having a duration proportional to the length of the defect along a line substantially transverse to the direction of movement of the strip, means proportional to the speed of the strip for energizing said sweep generator at set intervals to repeat the optical traverse by said television camera tube, a square wave generator connected to the output of said signal generating means, a gate circuit, means connecting the output signals of said signal generating means and said square wave generator to said gate circuit, an inverter, means connecting the output signal of said gate circuit to said inverter, a differentiator circuit connected to the output signal of said inverter, a clipper circuit connected to the output signal of said differentiator circuit, a second square wave generator connected to the output signal of said clipper circuit, an adder circuit connected to the output signals of said second square wave generator and said inverter, a pulse generator, a second gate circuit connected to the output signals of said adder circuit and said pulse generator, a third square wave generator connected to the output signal of said first square wave generator, a fourth square wave generator connected to the output signal of said third square wave generator, a second clipper circuit connected to the output signal of said differentiator circuit, a third gate circuit connected to the output signal of said second clipper circuit and said third square wave generator, a fourth gate circuit connected to the output signals of said fourth square wave generator and said second clipper circuit, a pair of integrators one connected to the output of said third gate circuit and one to the output of said fourth gate circuit, a pair of shapers one connected to each of said pair of integrators, a pair of differentiators one connected to each of said pair of shapers, an adder circuit connected to the outputs of said pair of differentiators, a counter connected to the output of said last named adder circuit for counting the number of defects in said strip, a fifth square wave generator connected to the output signal of said last named adder circuit, a pulse generator, a gate circuit connected to the output signal of said last named adder circuit and said fifth square wave generator, an adder circuit connected to the output signals of said second and said last named gate circuits, and means connected to the output signal of said last named adder circuit for indicating the defective area of said strip.

References Cited by the Examiner

UNITED STATES PATENTS

| 2,674,915 | 4/1954 | Anderson | 88—14 |
| 2,818,467 | 12/1957 | Harris et al. | 250—219 X |
| 2,934,824 | 5/1960 | Braybrook et al. | 33—1 |
| 3,020,033 | 2/1962 | McCreanor et al. | 88—14 X |
| 3,020,034 | 2/1962 | Laycak et al. | 88—14 X |
| 3,035,478 | 5/1962 | Laycak | 250—219 X |
| 3,096,443 | 7/1963 | Laycak | 88—14 X |

FOREIGN PATENTS 708,347   5/1954   Great Britain.

JEWELL H. PEDERSEN, *Primary Examiner.*

E. G. ANDERSON, *Examiner.*

T. L. HUDSON, *Assistant Examiner.*